[11] 3,573,446

[72] Inventor Glenn D. Bergland
 Morristown, N.J.
[21] Appl. No. 643,902
[22] Filed June 6, 1967
[45] Patented Apr. 6, 1971
[73] Assignee Iowa State University Research
 Foundation, Inc.
 Ames, Iowa

[54] REAL-TIME DIGITAL SPECTRUM ANALYZER UTILIZING THE FAST FOURIER TRANSFORM
5 Claims, 2 Drawing Figs.

[52] U.S. Cl. .................................................. 235/156,
 324/77, 340/15.5
[51] Int. Cl. ...................................................... G06f 7/38
[50] Field of Search .......................................... 235/156,
 151.31, 152; 340/15.5; 340/15; 324/77; 324/77
 (B); 181/.5; 181/.5 (C) (D)

[56] References Cited
UNITED STATES PATENTS
3,180,445 4/1965 Schwartz et al. ............... 181/.5
3,023,966 3/1962 Cox et al. ....................... 235/81
3,009,106 11/1961 Haase ............................ 324/77

OTHER REFERENCES
Cooley & Tukey An Algorithm For the Machine Calculation of Complex Fourier Series Math. of Comp. Vol. 19 pp. 297— 301 April 1965
T. G. Stockham " High Speed Convolution and Correlation" 1966 Spring Joint Computer Conference pp. 229— 233
Gentleman & Sarde Fast Fourier Transforms - For Fun and Profit Fall Joint Computer Conference - 1966 pp. 563— 78

*Primary Examiner*—Malcolm A. Morrison
*Assistant Examiner*—David H. Malzahn
*Attorney*—Dawson, Tilton, Fallon and Lungmus ABSTRACT: A digital signal processing system for computing the finite discrete Fourier transform coefficients from a number (N) of digitized samples of an input signal in real time. The signal being analyzed is sampled a predetermined number of times over a given interval, and this number of samples is expressed as the product of two integers, $N = r_1 \cdot r_2$. An array of delay registers is arranged in the form of a matrix having $r_1$ columns and $r_2$ rows. The delay registers are controlled so that the contents may be transferred either in a column shift mode or in a row shift mode. While shifting the contents of the array in the row shift mode, the system computes an intermediate set of spectrum estimates which are stored in the array. From this intermediate set, the final coefficients are generated while shifting the contents of the array in its column shift mode.

Fig. 1.

—//— = SERIAL TRANSFER OF CONTROL SIGNALS
ALL OTHER LINES = PARALLEL TRANSFER OF DATA SIGNALS

Inventor
Glenn D. Bergland
By Dawson, Tilton, Fallon & Lungmus
Attys.

REAL-TIME DIGITAL SPECTRUM ANALYZER UTILIZING THE FAST FOURIER TRANSFORM

BACKGROUND

This invention relates to a digital signal processing system for computing the finite, discrete Fourier transform coefficients from a given number of samples of an arbitrary input signal taken over a predetermined time period.

The invention is particularly useful in signal processing apparatus for estimating the frequency spectrum of electrical signals such as might be obtained from sonar echo returns or seismic signals, or other phenomena wherein signal periods can be separated by "dead" periods in which no input signal is present. The present invention may also be used in applications wherein it is necessary to determine the frequency content of signals as an intermediate step in a more extensive computation. Such applications include voice encoding systems, cross correlators, and digital filters.

Although in many cases spectrum analysis can be performed off line in a general-purpose digital computer, other applications require that the estimates of the frequency spectrum be computed in real-time (that is, the computation of the spectrum is effected while the input signal is being received). Previous real-time spectrum analyzers have relied upon a bank of band-pass filters, each tuned to a separate discrete range of the frequency spectrum of interest. Other attempts have suggested using a single filter which operates sequentially on recurring time-compressed versions of the signal. This single filter could be tuned across the frequency spectrum, but more often the original signal is mixed with a local oscillator and swept by a fixed-frequency filter.

In some applications, the input signal varies so slowly that it can be sampled, and the spectrum estimates can be computed on a general purpose digital computer in real-time. In most cases, however, the volume of the required computation and the cost of using a general purpose computer have rendered these systems impractical from an economical standpoint.

Recently, a new approach was suggested by J. W. Cooley and J. W. Tukey in an article which appeared at page 297 of volume 19 Mathematics of Computation (1965). Their idea eliminated many of the redundant calculations inherent in prior systems for the evaluation of complex Fourier series; however, the idea as disclosed, contemplated performing the calculations on a general-purpose digital computer thereby rendering spectrum analysis in real-time uneconomical.

SUMMARY

The instant invention provides a special purpose digital signal processor which can economically perform real-time spectrum analysis as broadly outlined by Cooley and Tukey. In addition, the present invention can be time shared for calculating in real-time the complex Fourier coefficients of one or more signals received simultaneously.

THEORY

Theoretical aspects of spectrum analysis which will lead to a better understanding of the instant invention will be discussed before a detailed description of the preferred embodiment is given. For purposes of illustration, it will be assumed that a speech signal has been transmitted through a low-pass filter so that it contains frequency components only in the range of from zero to 4,000 Hz.

In the analysis, an estimate of the frequency components present in the voice signal will be obtained by analyzing the periodic repetition of an interval of the signal lasting for $T$ seconds. That is, a Fourier series analysis will be performed on a periodic function $A(t)$ which is identical to the function representing the speech signal over some finite time interval $(O,T)$. The result from a Fourier series analysis of successive intervals lasting for $T$ seconds may then serve as an estimate of the spectrum of the speech signal as a function of time.

The Fourier series representation for each $A(t)$ is then given by $$X'(j) = \frac{1}{T}\int_0^T A(t)e^{i(j\omega_0 t)}dt \quad (1)$$

Each function is the Fourier transform of the other. After being sampled, $A(t)$ can be expressed as $$A(t)_{sampled} = \sum_{k=0}^{N-1} A(k\Delta T)\delta(t-k\Delta T) \quad 0 \leq t \leq T \quad (2)$$

where $N$ is the number of samples, $T=N\Delta T$=the length of the record, $k=0,1,...,N-1$, and $\Delta T$ is the sample period. Therefore, $$X'(j) = \frac{1}{T}\int_0^T \left[\sum_{k=0}^{N-1} A(k\Delta T)\delta(t-k\Delta T)\right]e^{i(j\omega_0 t)} \quad (3)$$

where $$\omega_0 = \left(\frac{2\pi}{T}\right) \quad (4)$$

and $$X'(j) = \frac{1}{T}\sum_{k=0}^{N-1} A(k\Delta T) \int_0^T \delta(t-k\Delta T)e^{i(j\omega_0 t)}dt \quad (5)$$

Thus, $$X'(j) = \frac{1}{T}\sum_{k=0}^{N-1} A(k\Delta T)e^{i(j\omega_0 k\Delta T)} \quad (6)$$

Note that $\omega_0 = 2\pi/T = 2\pi/N\Delta T$ and denote $A(k\Delta T)$ by $A(k)$. Then $$X'(j) = \frac{1}{T}\sum_{k=0}^{N-1} A(k)[e^{2\pi i/N}]^{jk} \quad (7)$$

or $$X'(j) = \frac{1}{T}\sum_{k=0}^{N-1} A(k)W^{jk} \quad (8)$$

where $W = e^{2\pi i/N}$ and $j=0, 1, ..., N-1$.

The magnitudes of the coefficients given by equation (8) can be squared to give an estimate of the power spectrum of the original signal, as is commonly known. It is usually impossible to perform all of the complex arithmetic operations implied by equation (8) within a period of $T$ seconds as is required for real-time analysis.

Cooley and Tukey, however, have suggested a different approach. By letting $N=r_1 r_2$, the number of complex additions and multiplications can be reduced by a factor of at least $$\frac{r_1 \cdot r_2}{r_1 + r_2}$$

In brief, the Cooley and Tukey paper suggests using calculations performed in finding one spectral estimate to compute another spectral estimate. This is done by generating first a set of $N$ intermediate results and then computing the $N$ spectral estimates from these intermediate results.

Thus instead of evaluating equation (8) directly, the following sets of equations may be evaluated.

$$A_1(j_0, k_0) = \sum_{k_1} A(k_1, k_0)W^{j_0 k_1 r_2} \quad (9)$$

$$A_2(j_0, j_1) = \sum_{k_0} A_1(j_0, k_0)W^{(j_1 r_1 + j_0)k_0} \quad (10)$$

$$X(j_1, j_0) = A_2(j_0, j_1) \quad (11)$$

where $j = j_1 r_1 + j_0 \quad j_0 = 0, 1, ..., r^1-1 \quad j_1 = 0, 1, ..., r_2-1$
$k = k_1 r_2 + k_0 \quad k_0 = 0, 1, ..., r_2-1 \quad k_1 = 0, 1, ..., r_1-1$ Note that by expressing $j$ and $k$ in terms of two other integers, equations (9) and (10) are formed and the relabeling of equation (11) is required.

The $A_1$ terms of equation (9) are the intermediate results which are formed. By making use of each of these intermediate results while computing $r_2$ different values of $A_2$ (which are simply relabeled to form the complex spectral estimates), the total computation required is reduced significantly.

THE DRAWING

FIG. 1 is a block schematic diagram of a system according to the present invention; and FIG. 2 is a block schematic diagram of apparatus for generating the required weighting factors in FIG. 1.

DETAILED DESCRIPTION

Figure 1:
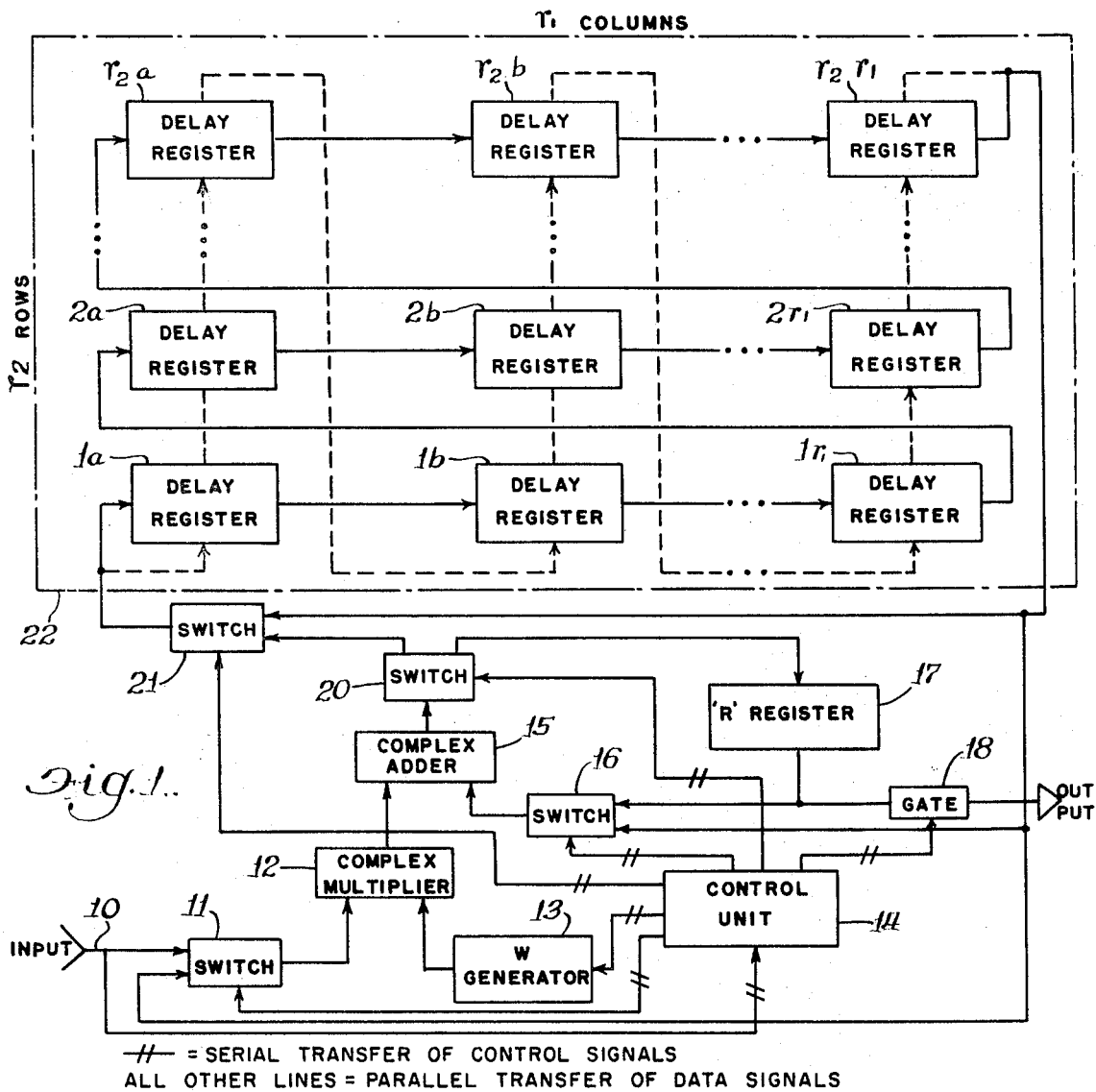

As has already been mentioned, the present invention contemplates expressing the number of samples ($N$) of the input signal being analyzed as the product of two integers $r_1$ and $r_2$. Referring to FIG. 1, the input samples are received in digitized form at 10 over a predetermined period of time, after which there would be a dead time. The input line 10 (actually a number of parallel lines) is coupled to one signal input of a switch 11. The output of switch 11 is fed to one input of a complex multiplier 12. The other input of complex multiplier 12 is received from a weighting function generator, hereinafter referred to as a $W$ generator 13 which is illustrated in block schematic form in FIG. 2 and described in detail below.

Switch 11, as well as all of the other functional logic blocks illustrated in this embodiment, may be any of a number of well known designs employing conventional circuitry; and it will not, therefore, be described at the circuit element level, but rather at its functional level. The switch 11 has two signal inputs which are received along the horizontal in FIG. 1, a control input received along the vertical in FIG. 1, and an output line. Again, the single lines represent signal paths for parallel lines. The control signal is a digital signal which couples one of the input signal lines to the output line if the control signal is in a first binary state, and it couples the second input line to the output if the control signal is in a second binary state.

The complex multiplier 12 is a combination of standard binary number multipliers which has at its input two complex numbers in binary representation, each complex number containing a real and an imaginary part. The complex multiplier 12 generates at its output a complex number which is the product of the two complex numbers at its inputs.

The output of the complex multiplier 12 feeds one input of a complex adder 15. The other input to complex adder 15 is received from a switch 16. The complex adder 15 is also a conventional system component in digital processing apparatus, and it generates at its output a complex number which is the algebraic sum of the two complex numbers at its inputs.

The control signal to switch 11 is received from a control unit 14. The control unit 14 timing information is synchronized with the analog to digital converter which forms the digitalized samples received at input 10.

The switch 16 is similar to the switch 11. One of its signal inputs is received from an R register, identified by reference numeral 17 in the drawing. Its control input is received from the control unit 14. The R register is a conventional storage register (one flip-flop for each binary digit of the number being stored) which will store a complex number until a new number is written into it. The R register 17 may be set to zero when a reset command is received from the control unit 14.

The output of R register 17 is also coupled to the input of a gate 18; and the output of the gate 18 is the output of the system, that is, the complex spectral estimates generated by the apparatus of FIG. 1. The gate 18 is also controlled by the control unit 14.

The output of the complex adder 15 is coupled to the input of a switch 20 which is controlled by the control unit 14. The switch 20 has only one input path, but it has two possible output paths. One output of the switch 20 is connected to the input of the R register 17; and the other output of the switch 20 is connected to the input of a switch 21. The switch 21 is similar to the switch 11; and it, too, is controlled by control unit 14.

The output of the switch 21 is coupled to the input of a memory array which is enclosed in chain line and identified by reference numeral 22. The array 22 includes a total of $N$ (the number of input samples) delay registers arranged in a matrix having $r_1$ columns and $r_2$ rows. Each delay register is a set of flip-flop circuits capable of storing one complex number in binary form together with gating circuitry for receiving input signals from either of two sources. The gating or shifting is controlled by the control unit 14.

In describing the interconnections between the various delay registers in the array 22, a convention will be made. In referring to the columns of the array, the delay registers will be assumed to be arranged in ascending order from left to right in FIG. 1; when referring to the rows of the array, it will be assumed that the delay registers are arranged in ascending order from bottom to top. Hence, the delay registers of the first row are labeled $1a, 1b, ..., 1r_1$. The delay registers of the second row are labeled $2a, 2b, ..., 2r_1$. The delay registers of the highest-order row are labeled $r_2a, r_2b, ..., r_2r_1$.

As illustrated by the solid line in the array 22, the delay registers are interconnected such that information from a given register may be shifted upon command to the adjacent register in the next higher order column, that is, the delay register to its right in FIG. 1. The information in the delay registers of the highest order column, that is, column $r_1$, is shifted to the input of the delay registers in the next higher order row and in the first column. This is illustrated by the interconnection between the output of delay register $1r_1$ and the input of delay register $2a$. These interconnections and this mode of shifting will be hereafter referred to as row shifting, since the information is first shifted through one row completely, and then through the next higher order row until it is shifted through all of the $r_2$ rows.

A second mode of shifting of information between delay registers in the array 22 is illustrated in dashed line, and it will hereinafter be referred to as column shifting. In this mode of shifting, information is shifted between adjacent delay registers in a given column in ascending row order; and from the delay register of the highest order row in one column to the delay register of the lowest order row in the column of next highest order. This is illustrated by the dashed line interconnecting the output of delay register $r_2a$ and the input of delay register $1b$.

The output from the array 22 (whether information is being transferred in the column shift mode or the row shift mode) is coupled to three separate places. The first location to which this information is coupled is a signal input of switch 21; the second place is a signal input of switch 16; and the third place is a signal input of switch 11. It will also be noted that each of the registers in the delay registers may be set to store the number $0+i0$ when it receives a reset pulse from the control unit 14. In all other cases, the information stored in the delay registers is received either from a delay register of the next lower order row (when the array is in the column shift mode) or from the delay register in the next lower order column (when the array is in the row shift mode), except for the end shifts that have previously been explained. The delay register $1a$ of the lowest order row and lowest order column receives its information from the complex adder 15 through switches 20 and 21 or in the alternative from the delay register $r_2r_1$ of the highest order row and highest order column through switch 21.

The operation of the array is similar to the operation of a conventional two-dimensional shift register where the complex numbers are shifted at each clock cycle. A preferred implementation of this apparatus employs $JK$ flip-flops as the individual storage elements for each bit in each of the delay registers. As is commonly known, these flip-flops perform the required shifting operations very conveniently. Conventional logic gates control the transmission path to be taken by the string of complex numbers.

Figure 2:
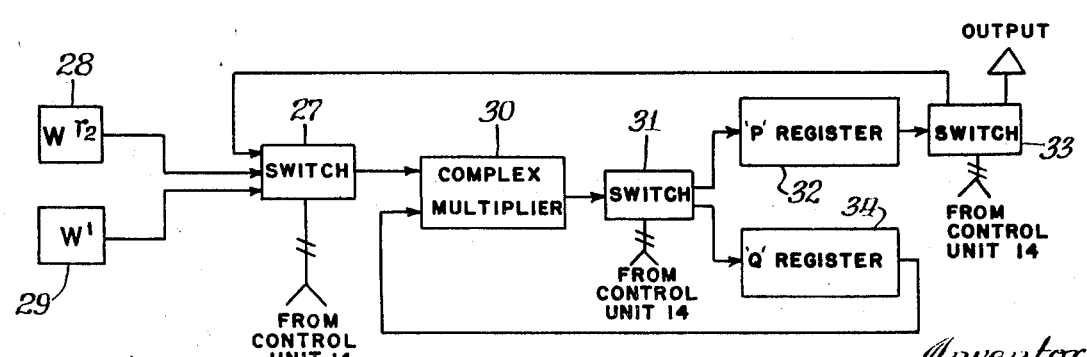

In FIG. 2 is shown in functional block form, the elements required to generate successive values of $W$, which is a complex number constituting an exponential weighting factor, the function of which will be made clear below. As shown in FIG. 2, a three-state switch 27 has three signal inputs; the first is received from a block 28 labeled $W^r$. A second input is received from a block 29 labeled $W^1$. The values of the latter two generators 28 and 29 are simply constant signals which have been preset by any conventional means but they are representative of the weighting factors identified in the blocks. The output of switch 27 is connected to one input of a complex multiplier 30 which is identical in function to the previously-described complex multiplier 12. The output of complex multiplier 30 is coupled to the input of a switch 31 which is similar to the previously-described switch 20.

One of the outputs of the switch 31 is coupled to the input of a P register 32 which feeds the input of a switch 33, similar to switch 31. The other output of the switch 34 is coupled to the input of a Q register which feeds the other input of the complex multiplier 30.

One of the outputs of the switch 33 is coupled to the third input of the switch 27; and the other output of the switch 33 (labeled OUTPUT in FIG. 2) is coupled to the input of the complex multiplier 12 in FIG. 1.

The P register 32 and the Q register 34 are conventional flip-flop registers with one flip-flop for each binary digit stored. When the P register receives a reset signal, it is set to the complex number $1+i0$. When the Q register receives a reset signal, it is set to a complex number which corresponds to the complex exponential weighting factor $W^{N_1r}$. For large values of $N$, further complex exponential weighting factors might have to be reset into these registers, but this depends upon the number of binary digits carried through the computation and the accuracy required in the spectral estimates.

The complex exponential rating factors $W^1$ and $W^r$ are required as possible inputs for complex multiplier 30; and, again depending upon the value of $N$ and the required accuracy, values of $W$ which can be computed from $W^1$ and $W^r$ still might be required to be supplied to halt the accumulation of round-off errors.

OPERATION

As each complex number $A(k)$ is received at the input of a system, the following five operations are performed:

1. $A(k)$ is multiplied by the value of $W$ provided by the $W$ generator 13 in the complex multiplier 12 of FIG. 1.

2. The contents of the delay registers comprising the array 22 are shifted once in the row shift mode.

3. The information stored in the delay register $r_2r_1$ is coupled through switch 16 into one input of the complex adder 15 which adds this signal with the output of the complex multiplier 12.

4. The resulting output of a complex adder 15 is transmitted through switches 20 and 21 and stored in delay register 1a.

5. The same sequential operation defined by steps 1—4 is repeated until it has been performed a total of $r_1$ times.

It will be noted that for the above operation, the switch 11 has been set such that it will transmit the signal from input 10 to the complex multiplier 12. At the same time, switch 16 has been set to transmit information from the output of the array 22, and switches 20 and 21 have been set to transmit information from the complex adder to delay register 1a. The delay registers 22 were all set to zero before the first multiplication was performed. The gate 18 has been inhibited by control unit 14 so that no signal is transmitted to the output.

A predetermined value of $W$ is required for each of the multiplications of step (1). For each of the first $N$ multiplications, the same value of $W$ is required, but this is not the case in general. The five operations outlined above are repeated for each of the $N$ different values of $A(k)$ received at the input. At the end of this complete operation, there have been performed a total number of complex multiplications equal to the product of $N \cdot r_1$, thereby requiring a total number of values of $W$ equal to $N \cdot r_1$ supplied from the $W$ generator 13. At the end of this time, the values of $A_1(k)$ defined by equation (9), have been generated and are stored in the array 22. As has been pointed out, these are the intermediate spectral estimates.

To compute the $A_2$ values which are the final spectral estimates defined by equation (10), switch 11 is set to transmit the output signals from the array 22 to the input of the complex multiplier 12, switch 20 is set to transmit the output of the complex adder 15 to the input of the R register 17, and switch 16 is set to transmit the output of the R register 17 to the other input of the complex adder 15. At the same time, switch 21 is set to receive information from the array 22 and the output gate 18 is still inhibited. With the system thus set up, the following operations are performed:

1. The R register 17 is reset.

2. The information stored in delay register $r_2r_1$ (that is the value of $A_1(k)$ which had been generated) is coupled through switch 11 to the complex multiplier 12 which receives at its other input a value from the $W$ generator 13. At this time, the $W$ generator 13 is operating in its second mode under direction of control unit 14 as will be described below. The two inputs are then multiplied in the complex multiplier 12.

3. The contents of the R register 17 are coupled through switch 16 and added to the output of the complex multiplier 12 in the complex adder 15.

4. The output of the complex adder 15 is then shifted through switch 20 to the R register 17.

5. The contents of the delay register $r_2r_1$ are coupled through switch 21 to the input of the delay register 1a. At this time, the array has been actuated in its column shift mode; and the contents of each of the delay registers in the array 22 are shifted in this manner.

6. The operation of steps (2), (3), (4), and (5) is repeated for a total of $r_2$ times.

7. Gate 18 is then enabled by control unit 14 to transmit the value of a complex spectral estimate to the output.

8. The operation of steps 1—7 is repeated for a total of $N$ times thereby computing all $N$ of the complex spectral estimates.

It will be obvious in the second mode of operation, for all of the total of $N$ times the first 7 operations are performed, a train of $r_2$ values of $W$ must be supplied by the $W$ generator 13. Thus, for each spectrum analysis of $N$ points, a string of $N \cdot r_1$ values of $W$ must be calculated in the first mode of operation; and a train of $N \cdot r_2$ values of $W$ must be calculated in the second mode of operation. This requires that one value must be supplied as a multiplier for each of the $N(r_1+r_2)$ multiplications performed by complex multiplier 12.

OPERATION OF THE WEIGHTING FUNCTION GENERATOR

The operation of the W generator illustrated in block schematic form in FIG. 2 is as follows.

1. The Q register 34 is reset to a value $W^{N-r_2}$

2. The P register 35 is reset to a value $W^0$.

3. The contents of the Q register 34 is multiplied by the value of $W^{r_2}$ coupled through switch 27 into the complex multiplier 30. The result is then coupled from the output of the complex multiplier 30 through switch 31 back into the Q register 34.

4. The contents of P register 32 are coupled through switch 33 to the input of the complex multiplier 12 in FIG. 1.

5. Switch 27 is set to its first position, and the contents of the P register 32 are multiplied by the contents of the Q register 34 in the complex multiplier 30, and the product is stored in the P register 32.

6. The operation of steps 4 and 5 is repeated for a total of $N$ times.

7. The operation of steps 2—6 is repeated for a total of $r_1$ times. It is noted that the execution of the first seven steps will supply the $N \cdot r_1$ values of $W$ required for the first mode of operation of the apparatus of FIG. 1.

The second mode of operation of the W generator 13 will supply the $N$ times $r_2$ values of $W$ required for its second mode of operation. The second mode of operation is as follows:

1. The Q register 34 is reset to the value of $W^{N_{11}}$.
2. The P register 32 is reset to a value of $W^0$.
3. Switch 27 is set to its third position and the contents of the Q register 34 are multiplied by the value in the block 29 equal to $W^1$. The result is then coupled from the output of the complex multiplier 30 through switch 31 back into the Q register 34.
4. The state of switch 33 is changed, and the contents of the P register 32 are transmitted to the complex multiplier 12 in FIG. 1.
5. The state of switch 33 is again changed, switch 27 is set to position 1, and switch 31 is set to feed the input of the P register 32. The contents of the P register 32 are multiplied by the contents of the Q register 34 in the complex multiplier 30 and the product is stored in the P register 32.
6. The operation of steps 4 and 5 is repeated for a total of $r_2$ times.
7. The operation of steps 2—6 is repeated for a total of $N$ times, and the W register is then reset to its first mode of operation.

I claim:

1. A digital spectrum analyzer for computing the finite discrete Fourier transform coefficients from a number ($N$) of digitized samples, represented by $A(k)$, of an input signal comprising: an array of delay registers forming a matrix having $r_1$ columns and $r_2$ rows; row shift means for transferring the contents of said delay registers in a row shift mode wherein the contents of a delay register are transferred to the adjacent register in a higher order column along the same row, the contents of the delay register in the highest order columns being transferred to the delay register in the next higher order row and of the lowest order column; means operative independently of said row shift means for transferring the contents of said delay registers in a column shift mode wherein the contents of said delay registers are transferred along the same column to an adjacent delay register of higher order row, the contents of the delay registers in the highest order row being transferred to the delay register in the next higher order column and lowest order row, the output of the delay register in the highest order column and highest order row defining the output of said array; multiplier means receiving said input signals for multiplying said signal by a predetermined value of a weighting factor; adder means for adding the output of said array and for storing the resultant in the delay register of lowest order column and lowest order row; and control means for operating on each of said $A(k)$ input signals, said operation including transferring said input signal to said multiplier means wherein it is multiplied by said weighting factor signal, shifting the contents of said array in said row shift mode, transferring the output of said multiplier means and the output of said array to said adder means wherein they are added, and storing the output of said adder means in the first delay register of said array, said control means operating on each of said $A(k)$ input signals a total of $r_1$ times, whereby intermediate estimates of said Fourier coefficients are stored in said delay registers.

2. The apparatus of claim 1 wherein said control means is operative after said $r_1$ operations to transfer the output of said array to the input of said multiplier means, and further comprising first register means receiving the output signals of said adder means; means for coupling the output signals of said first register means to one input of said adder means; means for rendering said weighting factor signal generator in a second mode of operation for supplying signals to the other input of said complex multiplier; and second control means for rendering operative said multiplier means to multiply the contents of said weighing factor signal generator with the output signals of said array, for adding in said adder means the contents of said multiplier means with the contents of said first register means and for storing the results in said first register, and for coupling said array output to said array input; and means for actuating said array in said column shift mode and for repeating the operation of said second control means a total of $r_2$ times thereby computing each of $N$ of the complex spectral coefficients which may be fed to an output while operating said array in said column shift mode.

3. The apparatus of claim 2 wherein said weighting factor signal generator comprises: means for storing a constant signal representative of a value $W_r$ ; means for storing a constant signal representative of a value $W^1$, second multiplier means; second and third register means; means for selectively coupling the output of said second multiplier means to either of said last-named registers; switching means for selectively coupling the output signal of said second register to said first multiplier means or to said second multiplier means; means for selectively coupling said constant signals to said second multiplier means; means for setting said third register to a signal value $W^{N-r_2}$, means for setting said second register to a signal value $W^0$; means for coupling the output of said third register and the output of said signal $W^{r_2}$ to said second multiplier means and for storing the product in said third register; means for coupling the output of said second register to the input of said first multiplier means as one of said weighting factor signals; means for selectively coupling the contents of said second and third registers to the input of said second multiplier means and for storing the product in said second register; and further control means for repeating said last-named operation a total of $N$ times thereby supplying said first $N$ values of said weighting factor signal.

4. The apparatus of claim 3 further comprising means for repeating the operation therein a total of $r_1$ times thereby supplying a number $N \cdot r_1$ of values of said weighting factor required for said first mode of operation.

5. The apparatus of claim 4 wherein said means for operating said weighting factor signal generator in a second mode of operation comprises means for resetting said third register to a value of $W^{N_{11}}$; means for resetting said second register to a value $W_0$; means for coupling the contents of said third register and the contents of said $W^1$ to said second multiplier; and means for storing the product in said third register; means for selectively coupling the contents of said second register to said first multiplier; means whereby the contents of said second and third registers are multiplied and the product stored in said second register; means for repeating said last-named steps a total of $r_2$ times; and means for repeating said second mode of operation a total of $N$ times thereby supplying a total of $N \cdot r_2$ values of said weighting factor in said second mode of operation.